(12) United States Patent
Craig, Jr.

(10) Patent No.: US 6,247,206 B1
(45) Date of Patent: Jun. 19, 2001

(54) TIGHTENING MEANS FOR HOSE CLAMPS

(76) Inventor: Paul M. Craig, Jr., 207 Quaint Acres Dr., Silver Spring, MD (US) 20904-2715

( * ) Notice: Subject to any disclaimer, the term of this patent is extended or adjusted under 35 U.S.C. 154(b) by 0 days.

(21) Appl. No.: 09/504,850

(22) Filed: Feb. 16, 2000

Related U.S. Application Data

(60) Provisional application No. 60/128,053, filed on Apr. 7, 1999.

(51) Int. Cl.[7] .................................................. B65D 63/00
(52) U.S. Cl. ...................................... 24/20 R; 24/20 CW
(58) Field of Search ............................... 24/20 R, 20 CW, 24/271, 22, 23 R, 23 EE

(56) References Cited

U.S. PATENT DOCUMENTS

| | | | |
|---|---|---|---|
| Re. 26,211 | * 5/1967 | Thurston et al. | 24/20 R |
| 3,475,793 | * 11/1969 | Oetiker | 24/20 R |
| 3,869,944 | * 3/1975 | Detiker | 24/20 CW |
| 4,222,155 | * 9/1980 | Oetiker | 24/20 R |
| 4,430,775 | * 2/1984 | Arthur | 24/20 CW |
| 4,724,583 | * 2/1988 | Ojima | 24/20 R |
| 5,070,579 | * 12/1991 | Hirabayashi | 24/20 R |
| 5,111,555 | * 5/1992 | Oetiker | 24/20 R |
| 5,940,939 | * 8/1999 | Geppert | 24/20 R |

* cited by examiner

Primary Examiner—Robert J. Sandy

(57) ABSTRACT

A tightening device for a clamp in the form of an outwardly extending ear with outwardly extending leg portions interconnected by a bridging portion at their outer ends whereby the leg portions at least in their outer parts diverge from one another in the inward direction to provide at least one of two features consisting of increased tolerance range of a given clamp size and interactive feedback for the correct positioning of the clamping tool.

35 Claims, 6 Drawing Sheets

TIGHTENING MEANS FOR HOSE CLAMPS

This Application claim benefit to provisional application 60/128,053 Apr. 7, 1999.

FIELD OF THE INVENTION

This invention relates to an improved clamp, especially for hoses, axle boots and the like, and more particularly to an improved tightening means for such clamps.

BACKGROUND OF THE INVENTION

So-called "Oetiker" ears as tightening means have enjoyed an immense success worldwide because of the ability to "breathe", i.e., compensate for thermal expansions, increase of pressure in the hose and aging of the hose without loss of the holding ability of the clamp. As described in U.S. Pat. No. 3,082,498, the typical "Oetiker" ear generally designated by reference numeral 2 (FIG. 1) of a so-called closed clamp generally designated by reference numeral 1 includes two parallel, outwardly extending leg portions 3 and 4 interconnected by a bridging portion 5, whereby the ear, when plastically deformed, assumes a more or less omega shape (FIG. 2). To avoid the need for special tools to achieve the desired omega shape in every case, a reinforcing groove 40' (FIG. 3) extending in the circumferential direction of the bridging portion 5 as described in U.S. Pat. No. 3,402,436 has been used in both so-called closed clamps as well as in so-called open clamps. Its use in so-called open clamps is shown in FIG. 4 which represents a clamp as described in U.S. Pat. No. 4,299,012 which includes in its improved mechanical connection a guide hook 31 and two cold-deformed, deep drawn support hooks 32 adapted to engage in apertures 35. This clamp is also provided with an arrangement achieving an inner clamping surface devoid of any step, discontinuity or gap and includes a tongue-like extension 61 adapted to engage in a central channel 63 beginning at the step-like portion 67 and terminating in the second step-like portion 65. An improved reinforcing means in the form of a shallow pan-shaped depression 40" with a substantially flat bottom and extending over a wide area of the bridging portion (FIG. 5) eventually replaced the reinforcing groove 40', as described in U.S. Pat. No. 5,305,499. Clamps with so-called "Oetiker" ears incorporating the aforementioned features are presently being used annually in large numbers involving hundreds of millions.

Because clamps with "Oetiker" ears, once installed, cannot be removed without destruction of the ear, it is important that the clamping tool be properly positioned relative to the ear and clamp before tightening the clamp by plastic deformation of the ear. On the assembly line, commercially available pneumatic tools are used to contract the clamp with essentially the same force. Though relatively rarely, operators using pneumatically actuated pincer-like tools, apply the tool incorrectly on the assembly line under pressure of time, i.e., fail to engage the tips of the jaws of the tool in the area of connection between the band portions and the outwardly extending leg portions of the ear which may result in an improperly installed clamp. The part then has to be removed, requiring sidelining the particular part with the incorrectly installed clamp, removing the clamp by destruction and radially installing a new clamp.

Another problem encountered with clamps is the ever-growing demand to increase the tolerance range of the clamp, i.e., to compensate for dimensional deviations of the hose and/or of the fixed member, such as a nipple, which the clamp of a given size can cover to fasten the hose reliably to the fixed member.

SUMMARY OF THE INVENTION

The instant invention seeks to overcome these shortcomings with presently available "Oetiker" ears by providing the operator with an interactive feel to indicate when the tightening tool is properly positioned relative to the ear of the clamp, before releasing the (pneumatic) tightening force. This is achieved in that the leg portions of the ear diverge from one another in the inward direction by forming a small angle with respect to the usual outward direction of the prior art leg portions so that, beginning at the bridging portion, at least the outer parts of the leg portions diverge from one another in the inward direction of the ear. In one preferred embodiment, re-entrant inner parts of the leg portions are then directed again toward one another so that the spacing at the inner ends of the leg portions in the non-contracted condition of the clamp is less than the maximum spacing of the leg portions, and preferably remains at least substantially the same as the length of the bridging portion in the longitudinal direction. The re-entrant inner parts of the leg portions are thereby preferably curvilinear in such a way that the configuration of the innermost part of the leg portions and of the adjacent respective clamping band portions conform at least approximately to the shape of the jaws of the pincer-like tools. In one embodiment, the curvilinear configuration of the re-entrant inner parts is thereby so chosen as to enhance the realization of the ultimate omega shape of the ear after plastic deformation thereof during the tightening phase. It may be desirable in that connection to provide the curvilinear parts of the leg portions with reinforcing means in the form of one or more side-by-side reinforcing grooves or embossments. The extent of these reinforcing embossments or grooves depends on the type of material and thickness of the clamping band as well as on the shape of the non-deformed plastically deformable ear and can be readily determined empirically for each clamp type. With the use of the present invention, the tool operator is able to feel when the tool is properly positioned to apply the tightening force because when sliding the jaws of the tool inwardly over the diverging leg portions, there occurs a slight resistance. When the jaws of the tool reach and pass into the re-entrant parts of the leg portions, this interactive feedback action on the jaws ceases, thereby providing interactive feedback to the operator that the tool is about to be properly positioned. As a result of the shape of the re-entrant parts, application of the tightening forces at that point will cause the tips of the jaws of the tool to move to the proper position in the area of connection with the clamping band. The maximum open position of the jaws of the pneumatic pincer-like tool are best correlated with the angle of divergence to achieve good feedback information.

The demand for an increased tolerance range of a given clamp size can also be realized in a simple manner with the present invention by the use of the feature of the diverging leg portion. This feature can thereby be used in conjunction with the interactive feedback or by itself without the interactive feedback feature in which case it provides by simple means an important improvement in the tolerance range for clamps of the type to which this invention relates without adversely affecting the normal holding and functioning of the ear.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DESCRIPTION OF THE INVENTION

Figure 5:
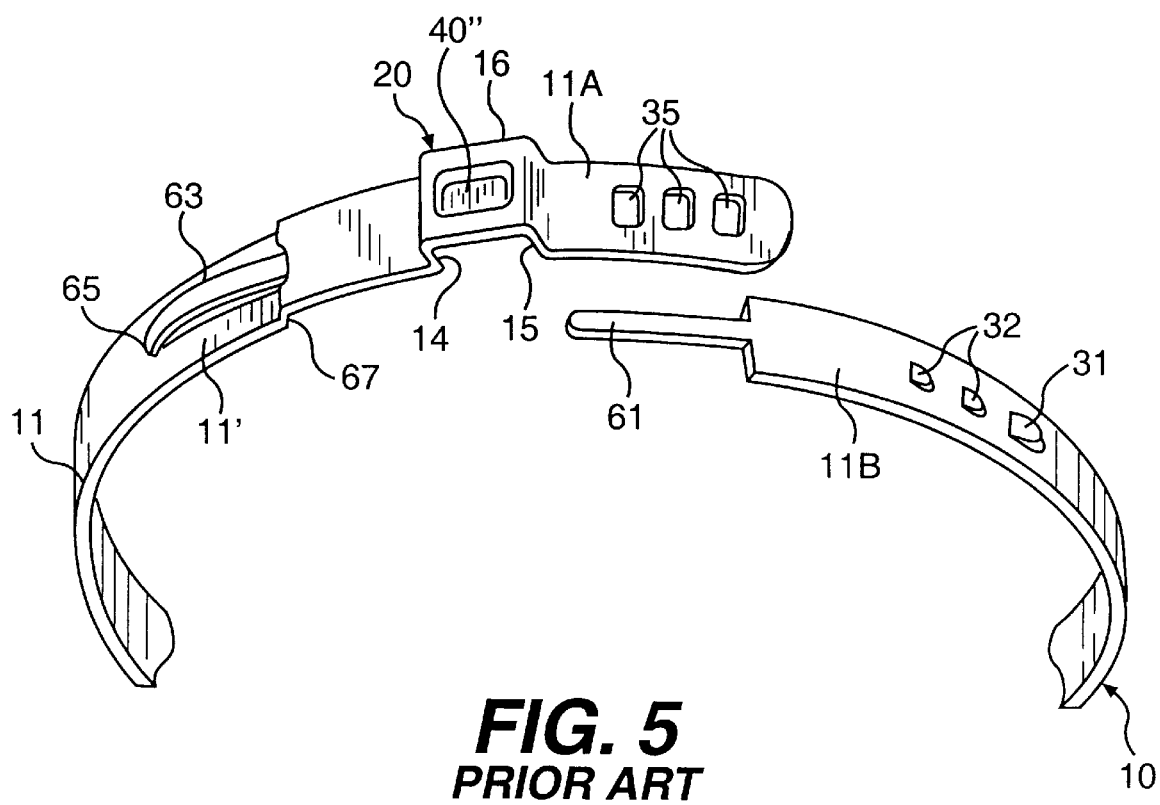
FIG. 5 is a perspective view, similar to FIG. 4, of a modified open clamp with an "Oetiker" ear provided with an improved reinforcing means in the bridging portion of the "Oetiker" ear in the form of a shallow, pan-shaped depression having a substantially flat bottom as disclosed in U.S. Pat. No. 5,305,499.
Figure 6:
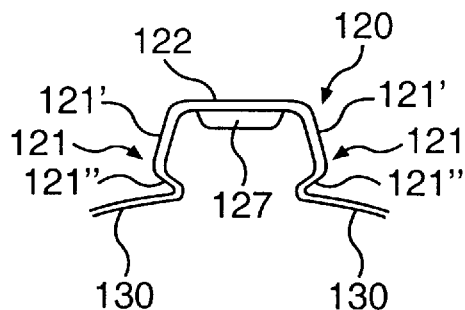
FIG. 6 is a partial axial view of a clamp with a tightening arrangement in the form of an outwardly extending ear incorporating the present invention.
Figure 7:
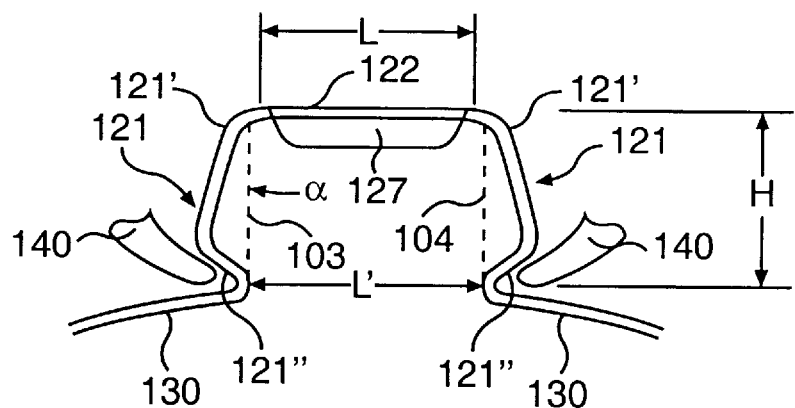
FIG. 7 is a partial axial view, on an enlarged scale, of a clamp in accordance with this invention, similar to FIG. 6 and illustrating details thereof.

Referring now to the drawing wherein like reference numerals of different 100 series are used to designate corresponding parts in the various embodiments, and more particularly to FIGS. 6 and 7, reference numeral 120 generally designates the tightening arrangement in the form of an outwardly extending plastically deformable ear in accordance with this invention which is integral with adjacent clamping band portions 130 of a pre-deformed clamp of any known construction and which includes leg portions generally designated by reference numeral 121 interconnected by a bridging portion 122 which may be provided with a reinforcing groove or indentation 127, preferably in the form of a shallow depression extending over a large part of the area of the bridging portion and having a relatively flat bottom as described in U.S. Pat. No. 5,305,499. The length L of the bridging portion in this as also in the other embodiments of this application is thereby at least equal to the height H of the ear. Instead of substantially straight, outwardly extending parallel leg portions 14 and 15 as used in the prior art (FIGS. 4 and 5) and schematically indicated in dash lines in FIG. 7 which extend outwardly parallel to one another, the leg portions 121 of this invention, diverging at least in the outer parts 121' thereof, from one another in the inward direction to form an angle α with respect to the leg portions 14 and 15 of the prior art "Oetiker" ears. The outer parts 121' of the leg portions in accordance with this invention are more or less rectilinear and terminate in re-entrant curvilinear portions 121" that preferably form together with the clamping band portions 130 of a clamping band usually made of galvanized steel or stainless steel to which they are connected at the inner ends by way of rounded-off configurations, a shape more or less resembling the configuration of the jaws 140 of the tightening tool of any known construction. An operator, when positioning the tool over the ear before tightening and moving radially inwardly over these leg portions 121, can feel a slight resistance as the open jaws move over the diverging outer parts 121' of the leg portions because with proper selection of the angle α relative to the maximum open position of the jaws, the jaws encounter a slight resistance which can be sensed by the operator. When the tool has reached a position of the jaws relative to the ear corresponding to the beginning of the re-entrant parts 121", the resistance ceases. This assures to the operator that the jaws, especially with some further inward movement of the tool, will then engage the point of connection between ends of the inner parts 121" of the leg portions 121 and the adjacent band portions 130. In case the operator applies the tool in the axial direction over the ear, a resistance to outward movement of the jaws by the re-entrant parts 121" again indicates proper tool position to the operator.

The optimum angle α can be readily determined empirically, depending upon the material and thickness of the clamping band as also on the construction of the tool, such as the maximum open position of the jaws of the tool. The re-entrant parts 121" may be provided with one or more side-by-side reinforcing grooves or embossments which extend at least over a part of the re-entrant parts 121". However, they may also extend even over a part into the outer leg parts 121', whereby the depth of the reinforcements may be substantially constant or may also be of varying, preferably gradually varying depths, especially at the ends thereof. The use of reinforcing grooves or embossments in the re-entrant parts 121" and in the outer parts 121' also depends on the type of material and thickness of the clamping band and again can be empirically determined as to length, depth and particular location thereof to optimize the deformed omega shape of the contracted ear. The same goes for the length of the outer leg parts 121' in relation to the inner leg parts 121".

Figure 1:
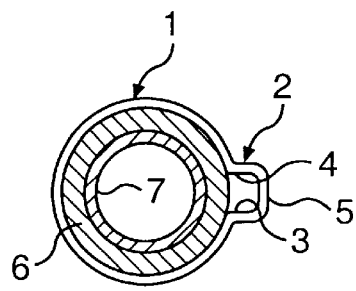
FIGS. 1 and 2 are axial views of a prior art so-called closed clamp showing in FIG. 1 a typical "Oetiker" ear in the uncontracted condition and in FIG. 2 the "Oetiker" ear in the contracted condition, as disclosed in U.S. Pat. No. 3,082,498.
Figure 2:
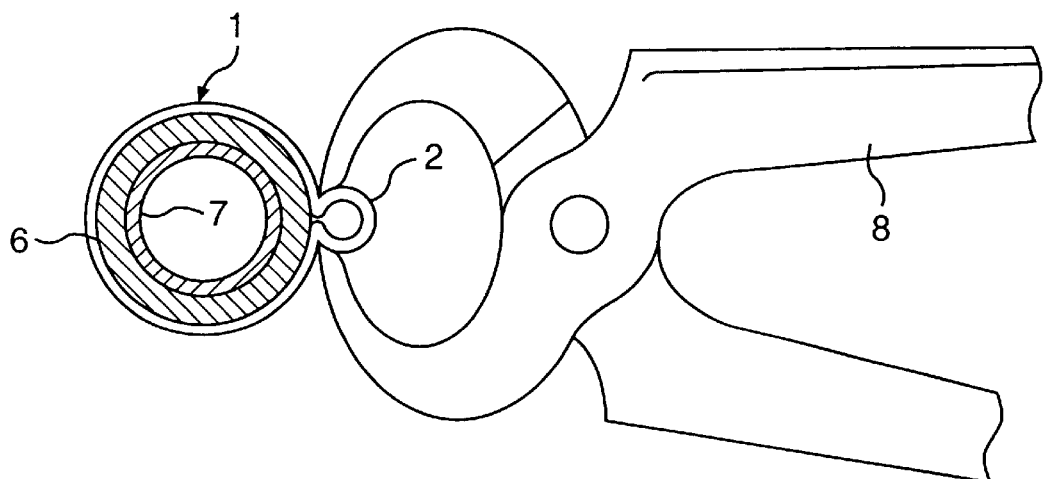
Figure 3:
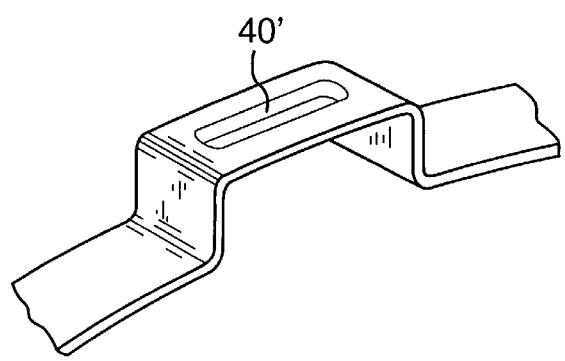
FIG. 3 is a partial perspective view illustrating a reinforcing groove in the bridging portion of a typical "Oetiker" ear as described in U.S. Pat. No. 3,402,436.
Figure 8:
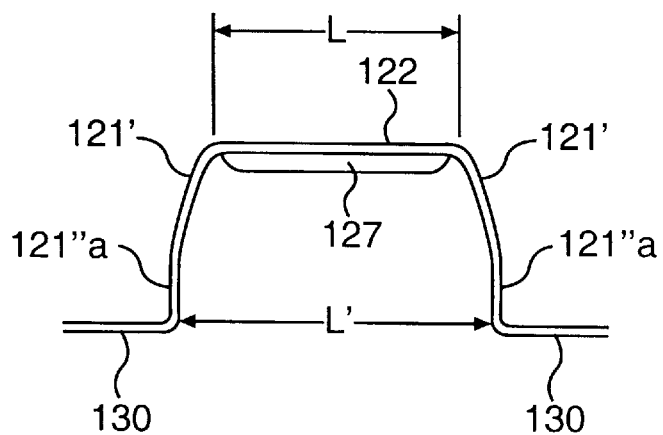
FIG. 8 is a schematic view, similar to FIG. 6, and illustrating another embodiment of a clamp of this invention as stamped out of a flat blank but prior to circular pre-deformation.

For purposes of manufacture, conventional manufacturing techniques can be used for the ear according to this invention. Moreover, FIG. 8 shows the configuration of a still further modified embodiment of an ear as stamped out from a flat blank before being pre-deformed which can be readily separated from the die whereby a final configuration of the ear, if so desired, as shown in FIGS. 6 and 7 can be imparted to the ear by any conventional means, for example, while the clamp is pre-deformed into more or less circular shape. The final shape may be imparted to the ear by any conventional means, for example, by applying forces directed toward one another at the point of connection between the inner ends of the leg portions and the adjoining clamping band portions. As shown in FIG. 8, the inner parts 121"a, which may eventually form re-entrant parts of the ear, are initially formed substantially straight and substantially parallel to one another as in FIG. 1, which permits separation of the flat blank from the die in the direction of the straight parts 121"a. However, as will be explained hereinafter, the embodiment of FIG. 8 as shown, i.e., without re-entrant parts, embodies the feature of increased range of tolerance coverage as the spacing L' is larger than the dimension L.

Figure 9:
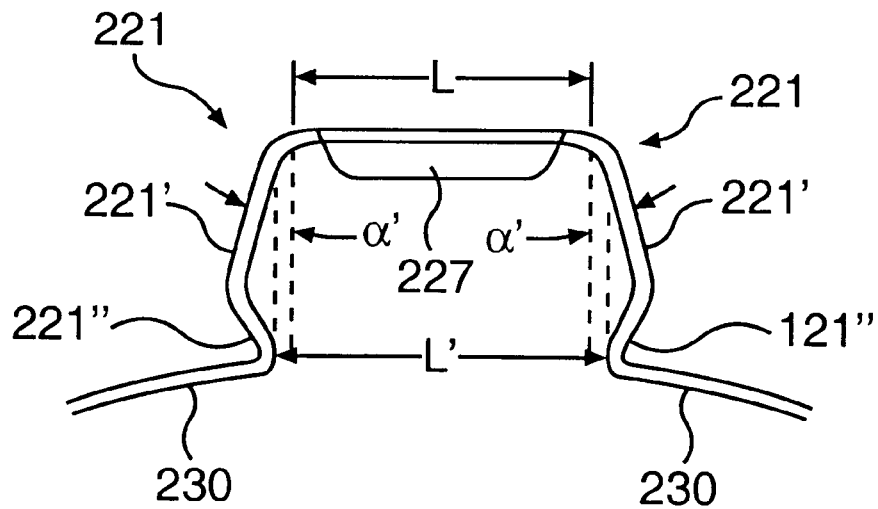
FIG. 9 is a partial axial view, similar to FIGS. 6 and 7, of a further modified embodiment of a clamp with a tightening device in the form of a plastically deformable ear embodying the present invention.

FIG. 9 illustrates a modified embodiment of the present invention in which the leg portions generally designated by reference numeral 221 are substantially straight over most of the length of their diverging outer parts 221' and are provided with a relatively much smaller re-entrant portion 221" in the shape of a small curvilinear notch formed between their inner ends 221" and the band portions 230. The angle α' is again chosen empirically to optimize the plastic deformation into omega shape and to achieve a desired length L' which determines the tolerance range covered by a given clamp size as will be explained more fully hereinafter. The same goes for the re-entrant portions 221" which are preferably of such shape again that the opening formed thereby with the band portions 230 will accommodate the tips of the jaws 40 of the tool. Of course, instead of being straight, the leg portions 221' may also be slightly curved, for example, convexly over their entire length or over only part of their inner or outer portions as may provide the optimum plastic deformation into omega shape for a given size, a given material, a given angle α' and a given material thickness.

Figure 10:
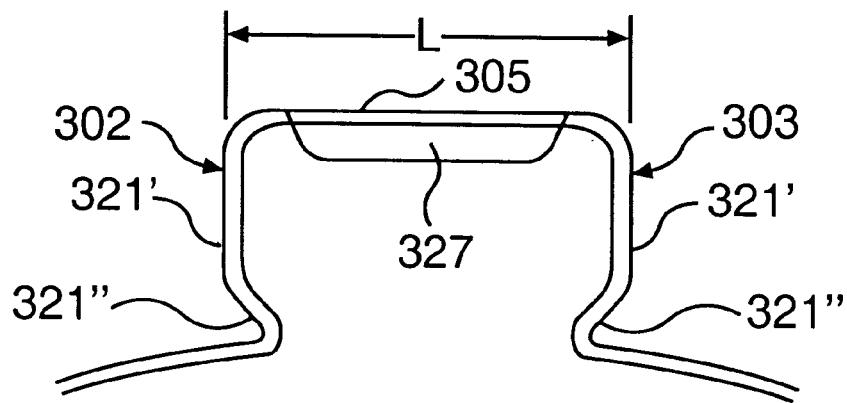
FIG. 10 is a partial axial view, similar to FIG. 9, of a still further modified embodiment of a clamp with a tightening device in the form of a conventional "Oetiker" ear embodying the present invention.

FIG. 10 illustrates the application of the present invention to so-called "Oetiker" ears of conventional shape as presently used in clamps in which the leg portions 302 and 303 extend rectilinearly in the outward direction parallel to one another to form 90° angles with the bridging portion 305. The interactive feedback can then be achieved by providing a small re-entrant portion 321" at the inner ends of the leg portions 302 and 303, possibly combined with a small angle deviating from this 90° angle by a few degrees, e.g., at most about 2° to about 4°. The feedback to the operator can be achieved if the normal spacing of the jaws of the tool in the open condition is at most equal to or possibly slightly less than the spacing L and if the jaws are able to slightly increase the spacing of the normal open condition, for example, against spring-loaded stops in the pneumatic tool determining the maximum opening of the jaws. The distance L' becomes smaller in this embodiment than the distance L, which results in a decrease of the possible tolerance range. If such a decrease is not acceptable, one might consider lengthening the distance L of the bridging portion so that the reduced distance L' will regain its predetermined desired length. In the alternative, one should consider the embodiment of FIG. 9 with an appropriate selection of the angle α' which may be kept just large enough to achieve a desired length L'. The present invention is thus applicable also to a clamp of the type shown in FIG. 8 in which small re-entrant parts in the form of small notches at the inner ends of the leg portions 121"a are provided similar to the re-entrant parts shown in FIGS. 9 and 10.

Figure 11:
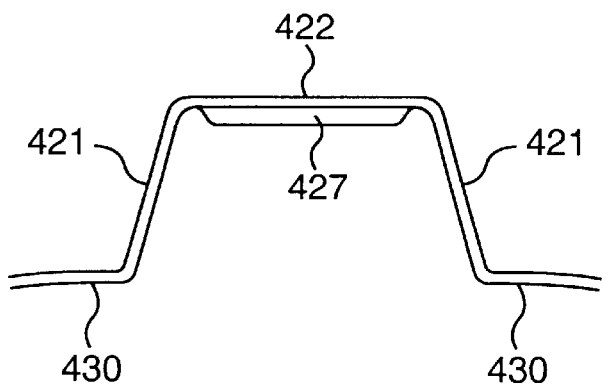
FIG. 11 is a partial axial view, similar to FIG. 8, of still another embodiment of a clamp with a tightening device in the form of a plastically deformable ear embodying this invention to increase the tolerance range but without interactive feedback.
Figure 12:
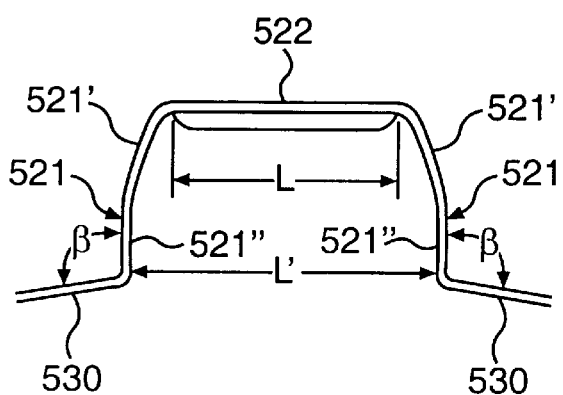
FIGS. 12 and 13 are partial axial views, similar to FIG. 11, of two further embodiments in accordance with this invention.

While the diverging leg portions 421 of FIG. 11 are rectilinear, the diverging leg portions 521 of FIG. 12 are slightly convexly shaped over at least most of their length and preferably terminate at their inner ends to form an angle β with their adjacent band portions 530 which depends on the direction of the inner ends of the leg portions 521. If these inner ends of the leg portions 521 are, for example, parallel to one another, then the angle β will be similar to the corresponding angle of the embodiments of FIGS. 4 and 5.

Figure 13:
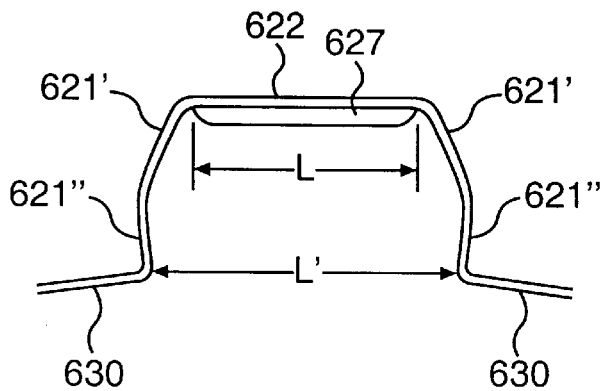

In FIG. 13, the inner parts 622", instead of being parallel, slightly converge toward one another, whereby the parameters are so chosen that L' is greater than L.

Apart from the feature of interactive feedback, this invention also provides an important improvement in the ability to increase the tolerance range of a given clamp size by an arrangement such as shown, for example, in FIGS. 8, 11, 12, 13 and 14 in which any re-entrant parts are completely omitted. In other words, if not interested in the interactive feedback feature, the re-entrant parts can then be completely omitted but the significant improvement in tolerance range can still be obtained by simple means. The angle α' is then chosen to provide the desired tolerance range and may be from a few degrees to about 35°, preferably from about 3° to about 25°. By making the inner leg portions 121"a of FIG. 8 and 521" of FIG. 12 substantially straight and parallel, the clamp will be very similar to present day "Oetiker" ears and will therefore perform in quite a similar manner when plastically deformed. For that purpose, the leg portions 121"a and 521" may also form a small angle, for example, between about 3° to about 15° to converge toward one another as shown in FIG. 13. Moreover, the connection between the divergent parts 121', 521' and 621' of the leg portions of FIGS. 8, 12 and 13 and the inner parts 121"a, 521" and 621" are preferably realized by curved parts of a radius of curvature appropriate for the given clamp material, clamp size and desired tolerance range (L') which can be empirically optimized. This radius of curvature is preferably larger than the radius of curvature of the connection of the outer parts 121', 521', 621' of the leg portions with the bridging portion 122, 522, 622.

The dimension L', i.e., the spacing between the points of connection of the leg portions with the clamping band portions in the non-contracted condition of the clamp is important to the range of tolerances in the hose and/or of the nipple or the like which can be covered by a given clamp size. The present invention thus provides a greater tolerance range with the same length L of the bridging portion because the spacing L' can be made larger than the length L of the bridging portion or the length L can be reduced for length L' providing the prior tolerance range. This is important as there are practical limitations on the length L. In the present invention values of angle α or α', even when larger than 25°, are acceptable, especially with the use of an appropriate length, shape and/or extent of reinforcements in the re-entrant parts 121" to achieve the final omega shape. Additionally, a low ear, i.e., extending outwardly only a small distance, for example, 5 mm in some sizes, which is desirable for several reasons, such as space availability and performance, can be maintained by the present invention by an appropriate selection of the aforementioned factors affecting the ear. The technical know-how obtained in connection with prior art clamps with plastically deformable ears can be used with ears according to this invention while at the same time assuring the advantages mentioned above.

The leg portions of plastically deformable ears embodying this invention, especially for embodiments without interactive feedback, may include outer and inner parts which are substantially rectilinear, preferably interconnected by a curved section, outer parts which are curvilinear connected to substantially rectilinear inner parts, outer parts which are substantially rectilinear connected to curvilinear inner parts, leg portions which are substantially rectilinear over substantially their entire length and leg portions which are curvilinear over substantially their entire length. The angle β depends on the angle of divergence and the overall shape of the ear and is preferably of the same order of magnitude as if the inner ends of the leg portions extended parallel to one another as in the prior art, or at most deviate from this angle by about ±8°, preferably about +4° and about −3°. The radii of curvature preferably increase from the outer ends toward the inner ends where they may approach zero, i.e., approach a rectilinear shape and are also parallel.

Figure 4:
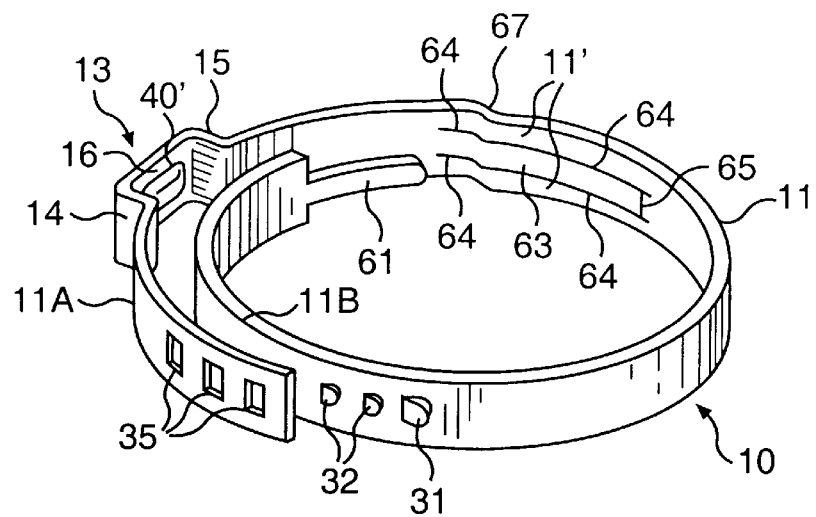
FIG. 4 is a perspective view of a so-called open stepless clamp, as disclosed in U.S. Pat. No. 4,299,012, with an "Oetiker" ear provided with a reinforcing groove of the type shown in FIG. 3.
Figure 14:
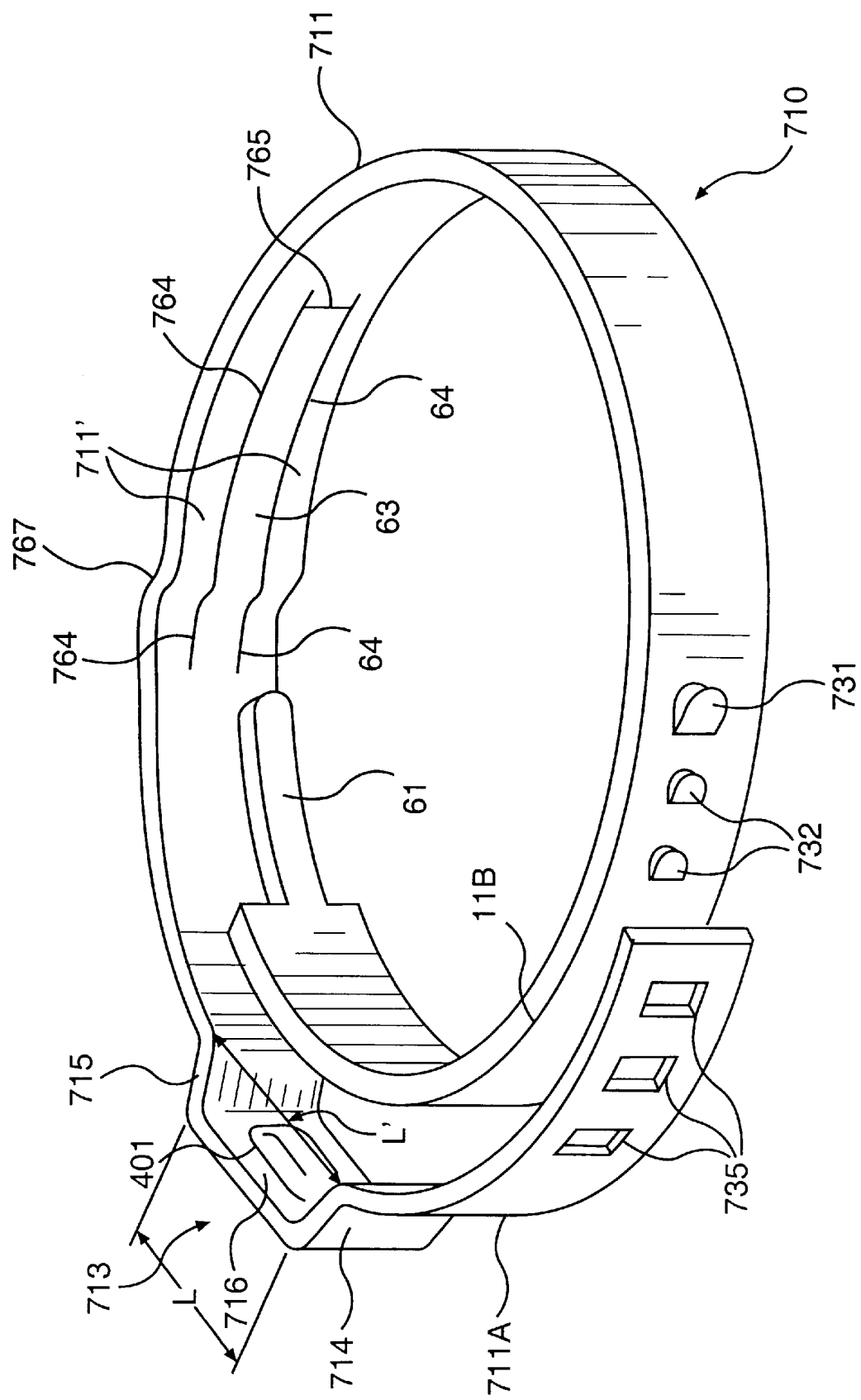
FIG. 14 is a perspective view of a clamp of the type shown in FIG. 4 which incorporates the feature of this invention of an increased tolerance range with the use of a plastically deformable ear of the type shown in FIG. 1.

FIG. 14 illustrates the present invention applied to a prior art clamp of the type illustrated in FIG. 4 without interactive feedback and in which the tolerance range is increased by means of a plastically deformable ear as shown in FIG. 11. However, it is understood that the ear may also have the configuration as shown in FIGS. 8, 12 or 13 or in FIGS. 7, 9 or 10 if interactive feedback is desired. In FIG. 14 the mechanical connection includes one or more cold-deformed, deep-drawn support hooks 732 and one guide hook 731 as disclosed in U.S. Pat. No. 4,299,012. However, the mechanical connection may also be realized by at least one combined guide-and-support hook as disclosed in U.S. Pat. No. 4,711,001. The clamp of FIG. 14 also assures an inner clamping surface devoid of any steps, gaps or discontinuities by the use of a tongue-like extension 761 at the inner band end portion and step-like portions 767 in the outer band portion of the clamping band and forming an opening in the step-like portions 767 by an appropriate cut-out through which the tongue-like portion 761 can extend. FIG. 14 also shows a pressed-out channel 763 terminating in a second step-like portion 765. However, the channel 763 is not essential and may be omitted, for example, may be cut away, as described in U.S. Pat. No. 4,315,348. Essential to the feature of a stepless inner clamping surface are the step-like portions 767 with the central opening for the tongue-like extension 761 and a height of the step-like portions at least substantially equal to the thickness of the clamping band. As the dimension L' in FIG. 14 is larger than the dimension L, FIG. 14 offers a significant improvement of an increased tolerance range.

While I have shown and described several embodiments in accordance with the present invention, it is understood that the same is not limited thereto but is susceptible of numerous changes and modifications as known to those skilled in the art, and I therefore do not wish to be limited to the details shown and described herein. For example, the absolute values of the height of the ear and of the length of the bridging portion depends on the clamp size. Furthermore, the length and shape of the outer leg parts, as well as the configuration of the re-entrant inner parts of the leg portions may be varied to accommodate particular configurations of the jaws of the tightening tools. The outer parts need not be rectilinear, but may be curved slightly, for example, convexly to produce optimum results upon plastic deformation with a given material and thickness of the clamping band. Additionally, the connection in FIG. 8 as also in the other embodiments between the outer ends of the leg portions 121' and the bridging portion are preferably made in the form of transitions with small radii of curvature in order to avoid undesirable stresses. Furthermore, the present invention may also be used with so-called closed clamps as well as with so-called open clamps using so-called "Oetiker" ears which are modified in accordance with this invention and thus form the improved tightening means for the clamp, for example, with clamps as shown in U.S. Pat. Nos. 2,614,304; 3,082,498; 2,847,743; 4,106,799; 4,222,155; 4,237,584 and 4,315,348. I therefore do not wish to be limited by the details shown and described herein but intend to cover all such changes and modification as are encompassed by the scope of the appended claims.

What is claimed is:

1. A tightening arrangement for a clamp, comprising an outwardly extending plastically deformable ear having outwardly extending leg portions interconnected by a bridging portion extending in a circumferential direction of the arrangement, characterized in that the leg portions, starting from their connection with the bridging portion, diverge from one another in the non-deformed condition in an inwardly direction of the arrangement at least over part of their length.

2. A tightening arrangement according to claim 1, characterized in that the outer parts of the leg portions terminate in inner parts.

3. A tightening arrangement according to claim 2, wherein said inner parts form re-entrant parts with adjoining parts of the clamp at points spaced from one another closer than the maximum spacing between the diverging leg portions.

4. A tightening arrangement according to claim 3, wherein the re-entrant parts are curvilinear.

5. A tightening arrangement according to claim 4, wherein the curvilinear configurations of the re-entrant parts are such as to favor a plastic deformation of the ear into an approximately omega shape.

6. A tightening arrangement according to claim 3, in which at least a part of the re-entrant parts of the leg portions are provided with reinforcing means.

7. A tightening arrangement according to claim 6, wherein the inner parts are connected with the outer parts by a rounded-off section, and wherein the reinforcing means extend over substantially the entire rounded-off section.

8. A tightening arrangement according to claim 3, in which the point of minimum spacing between the re-entrant parts is at least substantially the same as the length of the bridging portion in the circumferential direction.

9. A tightening arrangement according to claim 8, in which said minimum spacing is larger than the length of the bridging portion to thereby increase the range of tolerances to be covered by the clamp.

10. A tightening arrangement according to claim 1, wherein the outer parts are substantially straight.

11. A tightening arrangement according to claim 10, wherein the substantially straight parts extend over at least nearly the entire length of the leg portions.

12. A tightening arrangement according to claim 1, wherein said leg portions are convexly shaped at least over part of their length.

13. A tightening arrangement according to claim 12, wherein the convex shape of the leg portions extends over at least nearly the entire length of the leg portions.

14. A tightening arrangement according to claim 1, in which the inner ends of the leg portions are substantially parallel.

15. A clamp with a clamping band and a tightening arrangement in the clamping band according to claim 1.

16. A clamp with a clamping band and a tightening arrangement in the clamping band according to claim 15, further comprising means for increasing the tolerance range of the clamp.

17. A tightening arrangement according to claim 1, in which the leg portions, inwardly thereof, are connected to a clamping band, characterized in that the spacing between the points of connection of the leg portions with the clamping band is less than the maximum spacing between diverging leg portions.

18. A tightening arrangement according to claim 1, characterized in that the angle of the outer diverging parts of the leg portions with the bridging portion is greater than 90° by at least 4°.

19. A clamp according to claim 18 wherein said angle is between about 8° and about 35°.

20. A tightening arrangement according to claim 1, wherein the diverging leg portions subtend an angle with the bridging portion which is greater than 90°.

21. A clamp comprising clamping band means and means for tightening the clamp about an object to be fastened thereby, said tightening means including a plastically deformable ear-like means having outwardly extending leg portions interconnected at their outer ends by a bridging portion and connected at their inner ends with parts of the clamping band means, and the leg portions of said ear-like means diverging from one another in the non-deformed condition of the ear-like means from their connection with the bridging portion over at least part of their length.

22. A clamp according to claim 21 wherein said leg portions include inner part and outer diverging parts.

23. A clamp according to claim 22, wherein said outer and inner parts are substantially rectilinear and interconnected by a curved section.

24. A clamp according to claim 23, further comprising reinforcing means in at least said curved band section.

25. A clamp according to claim 22, wherein said inner parts form re-entrant parts.

26. A clamp according to claim 25, wherein said re-entrant parts form notch-like sections together with the adjoining clamping band parts, and said notch-like sections being of a shape for accommodating the tips of jaws of a tightening tool.

27. A clamp according to claim 22, wherein at least one of the inner and outer parts are curvilinear.

28. A clamp according to claim 27, wherein both inner and outer parts are curvilinear.

29. A clamp according to claim 22, wherein at least the inner ends of the inner parts terminate substantially parallel to one another.

30. A clamp according to claim 22, further comprising reinforcing means extending at least over a part of inner and outer leg portions.

31. A clamp according to claim 21, wherein the diverging leg portions subtend an angle with the bridging portion greater than 90°.

32. A clamp, comprising clamping band means, means for mechanically connecting overlapping band portions of the clamping band means, means for tightening the clamp about an object to be fastened thereby, said tightening means including plastically deformable ear-like means having outwardly extending leg portions interconnected at the outer ends thereof by a bridging portion of a length at least equal to the height of the ear-like means, said leg portions being connected at their inner ends with parts of the clamping band means, and further means for enabling at least one of increase in the tolerance range of the clamp and interactive positional feedback of the tightening tool, said further means including diverging outer parts of the leg portions which diverge in the non-deformed condition of the ear-like means from one another inwardly from their connection with the bridging portion at least over a part of the length of the leg portions.

33. A clamp according to claim 32, wherein the inner ends of the inner parts of the leg portions form an angle with the clamping band portions which corresponds at least approximately to the angle that exists when the inner ends are parallel to one another and form the same angle with the clamping band portions.

34. A clamp according to claim 33, further comprising reinforcing means extending over at least part of curved sections in said leg portions.

35. A clamp according to claim 21, wherein the diverging outer ends of said leg portions subtend an angle greater that 90° with the bridging portion.

* * * * *